United States Patent
Chiba et al.

(10) Patent No.: US 10,933,834 B2
(45) Date of Patent: Mar. 2, 2021

(54) VEHICLE ROOF STRUCTURE AND METHOD FOR MANUFACTURING VEHICLE ROOF STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Akira Chiba, Kariya (JP); Yoshio Ichishita, Kariya (JP); Takafumi Hasegawa, Kariya (JP); Toyohisa Kodama, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 60 days.

(21) Appl. No.: 16/363,048

(22) Filed: Mar. 25, 2019

(65) Prior Publication Data

US 2019/0300061 A1 Oct. 3, 2019

(30) Foreign Application Priority Data

Mar. 27, 2018 (JP) .............................. JP2018-060406

(51) Int. Cl.
- B60R 21/213 (2011.01)
- B62D 25/06 (2006.01)
- B60R 21/00 (2006.01)

(52) U.S. Cl.
CPC ............ B60R 21/213 (2013.01); B62D 25/06 (2013.01); *B60R 2021/0006* (2013.01)

(58) Field of Classification Search
CPC ..... B60R 21/16; B60R 21/213; B62D 21/157; B62D 25/06
USPC .................. 296/187.13, 193.02, 193.12, 210
See application file for complete search history.

(56) References Cited

U.S. PATENT DOCUMENTS

| 8,915,540 | B2* | 12/2014 | Nishimura | ............. | B62D 25/06 |
| | | | | | 296/210 |
| 2011/0121614 | A1* | 5/2011 | Kobayashi | ............. | B62D 25/06 |
| | | | | | 296/210 |
| 2013/0214559 | A1* | 8/2013 | Vantrease | ............. | B62D 25/06 |
| | | | | | 296/187.12 |

(Continued)

FOREIGN PATENT DOCUMENTS

| JP | 2009-56873 A | 3/2009 |
| JP | 2009-262662 A | 11/2009 |

(Continued)

*Primary Examiner* — Jason S Daniels
(74) *Attorney, Agent, or Firm* — Sughrue Mion, PLLC (57) ABSTRACT

A vehicle roof structure includes a reinforcement extending in a width direction of a vehicle between two roof side rails on the opposite sides in the width direction. The load transmission member includes a first coupling portion that couples the load transmission member to the reinforcement and a second coupling portion that couples the load transmission member to one of the roof side rails. A load transmission portion is located between the first coupling portion and the second coupling portion when the load transmission member is viewed in the front-to-rear direction. The load transmission portion includes a part extending straight in the width direction. An inflator supporting portion extends from the load transmission portion.

9 Claims, 3 Drawing Sheets

(56) References Cited

U.S. PATENT DOCUMENTS

2016/0101672 A1* 4/2016 Oshima .................. B62D 25/00
296/216.04

FOREIGN PATENT DOCUMENTS

| JP | 2009-298335 A | 12/2009 |
| --- | --- | --- |
| JP | 2010-095088 A | 4/2010 |
| JP | 2015-67159 A | 4/2015 |

* cited by examiner

VEHICLE ROOF STRUCTURE AND METHOD FOR MANUFACTURING VEHICLE ROOF STRUCTURE

BACKGROUND

The present disclosure relates to a vehicle roof structure including an inflator and a load transmission member that transmits load from a roof side rail to a reinforcement and a method for manufacturing the vehicle roof structure.

Figure 6:
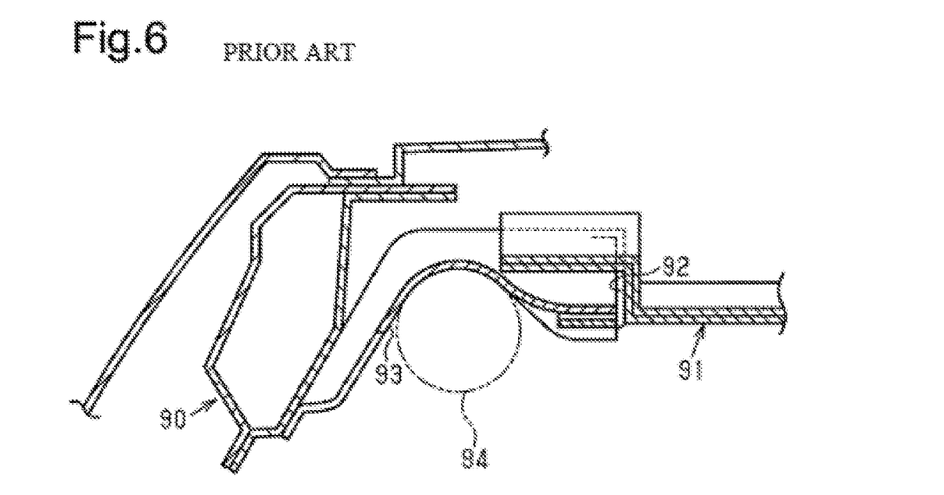
FIG. 6 is a diagram illustrating the prior art.

Japanese Laid-Open Patent Publication No. 2009-262662 discloses an example of a vehicle roof structure. As shown in FIG. 6 of the present application, the vehicle roof structure includes two roof side rails 90 extending in a front-to-rear direction of a vehicle on the opposite sides of the upper part of the vehicle in a width direction of the vehicle. FIG. 6 shows only one of the opposite sides of the upper part of the vehicle in the width direction and thus shows only one of the two roof side rails 90. The vehicle roof structure also includes a center frame 91 extending in the width direction between the two roof side rails 90. The center frame 91 includes two load-receiving portions 92, only one of which is shown in FIG. 6, respectively at the two ends in the width direction. The vehicle roof structure further includes two load transmission members 93, only one of which is shown in FIG. 6. The load transmission members 93 are coupled to the roof side rail 90 and the center frame 91 to couple the roof side rail 90 and the center frame 91 to each other.

The lower part of the load transmission member 93 includes a curtain shield airbag 94 (inflator) in the longitudinal direction of the roof side rail 90. The load transmission member 93 is curved as viewed in the front-to-rear direction to avoid the curtain shield airbag 94. When a side collision causes a side part of the vehicle to receive a side collision load, the side collision load is transmitted from the roof side rails 90 to the center frame 91 through the load transmission members 93.

However, in the vehicle roof structure using the load transmission member 93 as described in the above-described document, when a side collision occurs, it is desired that deformation of the load transmission member 93 be limited and that load be efficiently transmitted from the load transmission members 93 to the center frame 91.

SUMMARY

It is an object of the present disclosure to provide a vehicle roof structure that allows a side collision load to be efficiently transmitted to a reinforcement and a method for manufacturing the vehicle roof structure.

Examples of the present disclosure will now be described.

Example 1: A vehicle roof structure includes two roof side rails extending in a front-to-rear direction of a vehicle on opposite sides of an upper part of the vehicle in a width direction of the vehicle, a reinforcement arranged on a vehicle roof to extend in the width direction between the two roof side rails on the opposite sides in the width direction, a load transmission member coupled to the reinforcement and one of the two roof side rails so as to couple the roof side rail and the reinforcement to each other, the load transmission member transmitting load from the roof side rail to the reinforcement when a side collision occurs, and an inflator arranged on an inner side of the roof side rail. The inflator supplies an airbag with gas. The load transmission member includes a first coupling portion that couples the load transmission member to the reinforcement, a second coupling portion that couples the load transmission member to the roof side rail, and a load transmission portion located between the first coupling portion and the second coupling portion when the load transmission member is viewed in the front-to-rear direction. The load transmission portion includes a part extending straight in the width direction. The load transmission member viewed in the front-to-rear direction corresponds to the load transmission member viewed in a side view. The load transmission member also includes an inflator supporting portion that extends from the load transmission portion. The inflator supporting portion is configured to support the inflator.

With this structure, when a side collision causes a side part of the vehicle to receive a side collision load, the side collision load is transmitted from the roof side rails to the reinforcement through the load transmission member. As compared to, for example, a curved load transmission portion as viewed in the front-to-rear direction (in a side view), the above-described load transmission portion having the part extending straight as viewed in the front-to-rear direction (in a side view) resists deforming by the side collision load and allows the side collision load to be effectively transmitted to the reinforcement when a side collision occurs. Further, for example, in some cases, when the inflator is arranged in the vehicle in a state in which the reinforcement and the roof side rails have already been coupled to each other, the load transmission member may be curved so that the inflator does not interfere with the load transmission member. In the above-described structure, the inflator is supported by the inflator supporting portion so that the load transmission member is coupled to the reinforcement and the roof side rails while arranging the inflator. That is, since there is no need to curve the load transmission portion, the load transmission portion is arranged straight as viewed in the front-to-rear direction. This allows the side collision load to be efficiently transmitted to the reinforcement.

Example 2: In the vehicle roof structure according to example 1, the inflator supporting portion may be configured to support the inflator on an upper side of the load transmission member in a vertical direction of the vehicle.

With this structure, the inflator can be arranged between the vehicle roof and the load transmission portion. Thus, on the inner side of the roof side rail, no arrangement space is needed for the inflator below the load transmission member.

Example 3: In the vehicle roof structure according to example 1 or 2, the load transmission portion may be corrugated to include a recess extending in the width direction.

With this structure, the load transmission portion resists deforming by the side collision load.

Example 4: In the vehicle roof structure according to any one of examples 1 to 3, the load transmission member may include a temporary fixing portion configured to temporarily fix the load transmission member to the reinforcement and the roof side rail.

One of the examples of manufacturing the vehicle roof structure is to couple the load transmission member, which has the inflator supporting portion support the inflator, from the lower side of the reinforcement and the roof side rails. With the above-described structure, since the temporary fixing portion is used to temporarily fix the load transmission member to the reinforcement and the roof side rails, the load transmission member can be supported by the reinforcement and the roof side rails. The load transmission member integrally includes the first coupling portion, the second coupling portion, and the load transmission portion. Additionally, since the load transmission member supports the inflator, the weight increases. In the above-described structure, the effort to support the load transmission member is reduced by temporarily fixing the load transmission member to the reinforcement and the roof side rails, the task of coupling the load transmission member to the vehicle roof is facilitated.

Example 5: A load transmission member of a vehicle roof structure is provided. The load transmission member transmits load from one of two roof side rails to a reinforcement when a side collision occurs. The two roof side rails extend in a front-to-rear direction of a vehicle on opposite sides of an upper part of the vehicle in a width direction of the vehicle. The reinforcement is arranged on a vehicle roof to extend in the width direction between the two roof side rails. The load transmission member includes a first coupling portion that couples the load transmission member to the reinforcement, a second coupling portion that couples the load transmission member to the roof side rail, and a load transmission portion located between the first coupling portion and the second coupling portion when the load transmission member is viewed in the front-to-rear direction. The load transmission portion includes a part extending straight in the width direction. The load transmission member viewed in the front-to-rear direction corresponds to the load transmission member viewed in a side view. The load transmission member also includes an inflator supporting portion extending from the load transmission portion to support an inflator arranged on an inner side of the roof side rails. The inflator supplies an airbag with gas.

Example 6: A method for manufacturing a vehicle roof structure is provided. The method includes extending one of two roof side rails in a front-to-rear direction of a vehicle on one of opposite sides of an upper part of the vehicle in a width direction of the vehicle, extending the other one of the two roof side rails in the front-to-rear direction on the other one of the opposite sides of the upper part of the vehicle in the width direction, arranging a reinforcement on a vehicle roof to extend in the width direction between the two roof side rails on the opposite sides in the width direction, providing a load transmission member to allow load to be transmitted from the one of the two roof side rails to the reinforcement when a side collision occurs, coupling the load transmission member to the roof side rail and the reinforcement so as to couple the roof side rail and the reinforcement to each other, and arranging an inflator that supplies an airbag with gas on an inner side of the roof side rail. The providing the load transmission member includes arranging a first coupling portion that couples the load transmission member to the reinforcement on the load transmission member, arranging a second coupling portion that couples the load transmission member to the roof side rail on the load transmission member, and arranging a load transmission portion located between the first coupling portion and the second coupling portion when the load transmission member is viewed in the front-to-rear direction. The load transmission portion includes a part extending straight in the width direction. The load transmission member viewed in the front-to-rear direction corresponds to the load transmission member viewed in a side view. The providing the load transmission member also includes arranging an inflator supporting portion that supports the inflator to extend from the load transmission portion.

The present disclosure allows a side collision load to be efficiently transmitted to a reinforcement.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferable embodiments together with the accompanying drawings in which.

DETAILED DESCRIPTION

A vehicle roof structure according to an embodiment of the present disclosure will now be described with reference to FIGS. 1 to 5.

Figure 1:
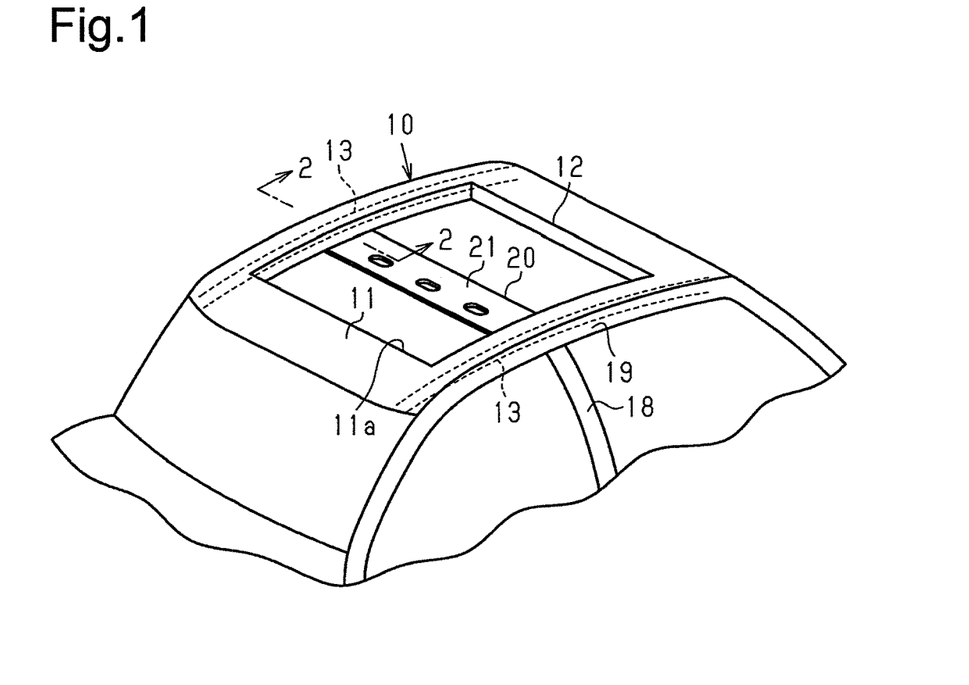
FIG. 1 is a partial perspective view schematically showing a vehicle roof structure.
Figure 2:
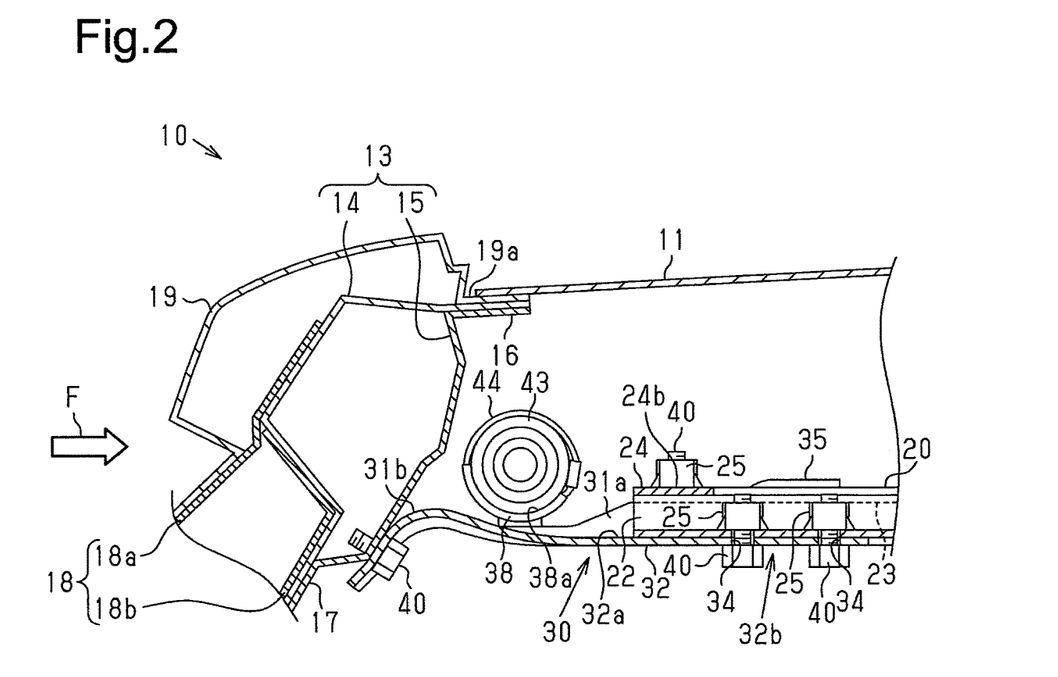
FIG. 2 is an enlarged cross-sectional view taken along line 2-2 in FIG. 1, showing the vehicle roof structure of FIG. 1.

As shown in FIGS. 1 and 2, a vehicle roof structure 10 includes a sunroof unit 12 arranged on the inner side of a vehicle roof 11, two roof side rails 13, a center frame 20 serving as a reinforcement, and two load transmission members 30. The sunroof unit 12 has the shape of a rectangular frame. Each roof side rail 13 extends in a front-to-rear direction of a vehicle on the opposite sides of the upper part of the vehicle in a width direction of the vehicle. The following description focuses on the structure between one of the two roof side rails 13 and one of the two ends of the center frame 20. The same applies to the structure between the other roof side rail 13 and the other end of the center frame 20.

As shown in FIG. 2, the roof side rail 13 is formed by joining a roof side rail outer part 14 and a roof side rail inner part 15 to each other. The roof side rail outer part 14 and the roof side rail inner part 15 are joined to each other at, for example, a first joined portion 16 located on the upper side of the vehicle and a second joined portion 17 located on the lower side of the vehicle. This forms a closed cross section.

The roof side rail 13 is covered from the outside by an outer panel 19 that is continuous with two center pillars 18. The two center pillars 18 are respectively arranged at substantially central parts in the front-to-rear direction on the opposite sides in the width direction and extend in a vertical direction of the vehicle. Each center pillar 18 is formed by joining a center pillar outer part 18a and a center pillar inner part 18b to each other. The outer panel 19 is joined to the vehicle roof 11 and the roof side rail 13 at a joined portion 19a. The center frame 20 is joined to the sunroof unit 12 to extend over a roof opening 11a formed in the vehicle roof 11.

Figure 3:
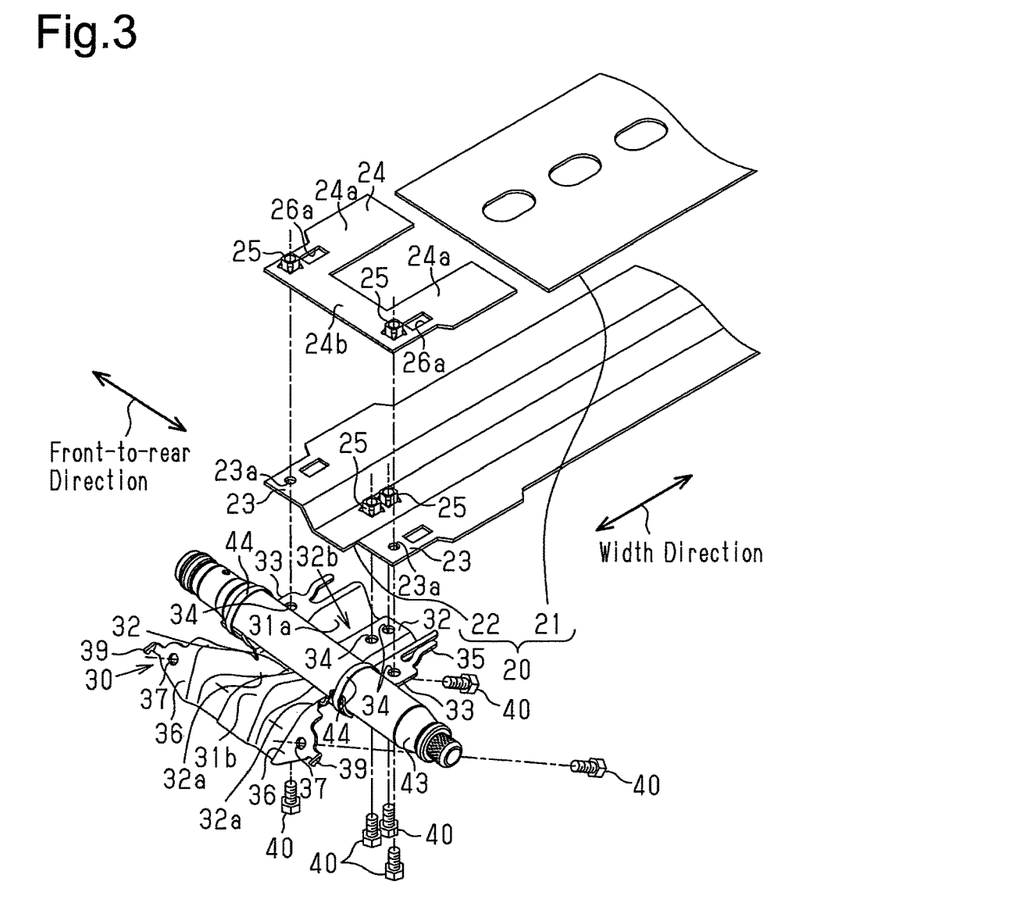
FIG. 3 is an exploded perspective view of a load transmission member, an inflator, and a center frame shown in FIG. 2.

As shown in FIG. 3, the center frame 20 is formed by overlapping and joining an upper frame 21 and a lower frame 22 with each other in the vertical direction. The upper frame 21 is an elongated flat plate with its long sides extending in the width direction. The lower frame 22 has a reversed hat-shaped cross section. The lower frame 22 includes two flanges 23 extending in the front-to-rear direction from the upper end. Each flange 23 has a through-hole 23a. Further, two coupling nuts 25 are respectively joined to the upper surfaces of recessed parts of the two ends of the lower frame 22 in the width direction, only one of which is shown in FIG. 3. The coupling nuts 25 are laid out in the width direction.

Two coupling plates 24, only one of which is shown in FIG. 3, are respectively joined to the two ends of the lower frame 22 in the width direction. Each coupling plate 24 includes overlapped portions 24a respectively overlapped with the two flanges 23 of the lower frame 22 and a coupling portion 24b that couples the two overlapped portions 24a. The coupling nuts 25 are joined to the upper surface of the coupling plate 24 respectively at positions facing the through-holes 23a of the flanges 23. The coupling plate 24 includes a coupling hole 26a at each overlapped portion 24a.

Figure 4:
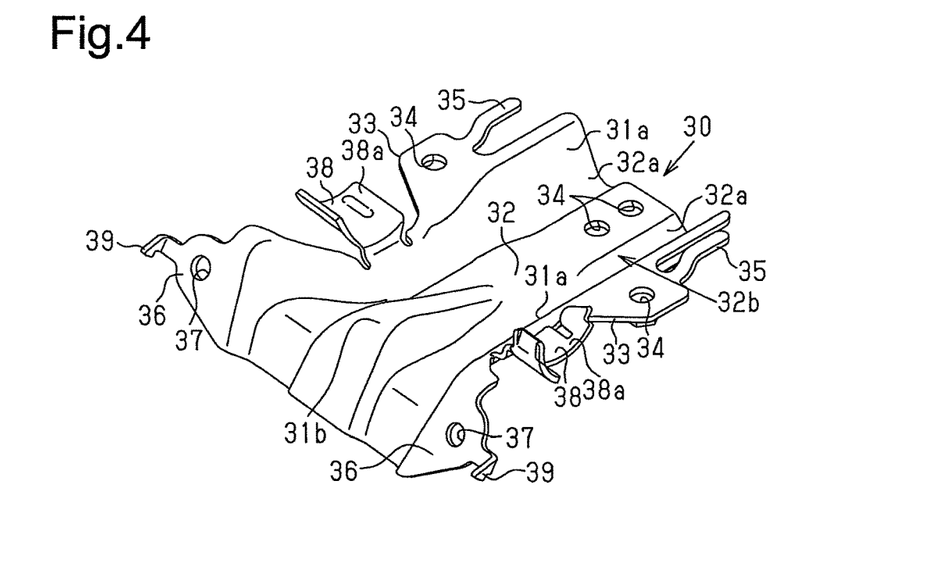
FIG. 4 is a perspective view of the load transmission member shown in FIG. 3.
Figure 5:
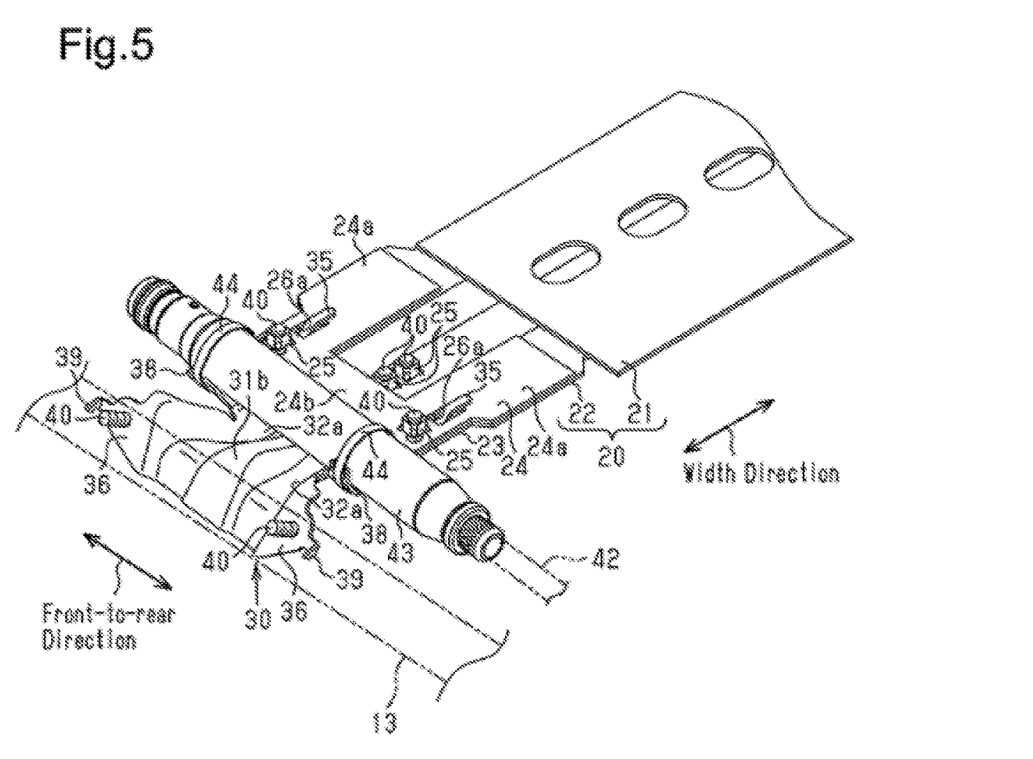
FIG. 5 is a perspective view of the load transmission member shown in FIG. 3 when coupled to the center frame and the roof side rails.

In the center frame 20, the load transmission members 30 are respectively coupled to the two ends in the width direction. As shown in FIGS. 3, 4, and 5, each load transmission member 30 has its long sides extending in the width direction and its short sides extending in the front-to-rear direction. The load transmission member 30 is formed by shaping a substantially flat plate. The load transmission member 30 includes a load transmission portion 32 at a central portion in the front-to-rear direction. When the load transmission member 30 is viewed from the upper side of the vehicle, the load transmission portion 32 is arranged over the entire load transmission member 30 in the width direction. The load transmission portion 32 includes a part 32b that extends straight when the load transmission member 30 is viewed in the front-to-rear direction. In the present embodiment, the load transmission portion 32 includes the part 32b extending straight as viewed in the front-to-rear direction in a section close to the center frame 20 in the longitudinal direction. In the present embodiment, when the load transmission member 30 viewed in the front-to-rear direction corresponds to the load transmission member 30 viewed in a side view, the load transmission portion 32 includes the part 32b extending straight in a side view. That is, when FIG. 2 shows a side view of the load transmission member 30, the part 32b extending straight in the sideward direction in FIG. 2 corresponds to the part 32b extending straight in a side view.

The load transmission portion 32 includes two first reinforced parts 31a on the opposite sides in the front-to-rear direction. The front-to-rear direction in FIG. 2 corresponds to the vertical direction with respect to the plane of FIG. 2. The first reinforced parts 31a are formed by bending the plate of the load transmission member 30 and act as the wall surfaces of reinforcement ribs. The first reinforced parts 31a are arranged over the entire load transmission portion 32 in the width direction (sideward direction in FIG. 2). The load transmission portion 32 includes two recesses 32a extending in the width direction on the opposite sides in the front-to-rear direction.

The load transmission portion 32 includes second reinforced parts 31b in a section close to the roof side rail 13 (left side in FIGS. 2 to 5). The second reinforced parts 31b are formed by bending the plates of the load transmission member 30 and act as the wall surfaces of reinforcement ribs. The two recesses 32a of the load transmission portion 32 are formed between the first reinforced parts 31a and the second reinforced parts 31b in the section close to the roof side rail 13. Thus, since the load transmission portion 32 includes the first reinforced parts 31a and the second reinforced parts 31b, the load transmission portion 32 is corrugated to include the recesses 32a, which entirely extend in the width direction.

In the section close to the center frame 20 (right side in FIGS. 2 to 5) of the load transmission member 30, the first reinforced parts 31a extend downward as the distance from the flat part of the load transmission portion 32 increases in the front-to-rear direction and then extend upward from the flat part of the load transmission portion 32. In the section close to the roof side rail 13 (left side in FIGS. 2 to 5) of the load transmission member 30, the first reinforced parts 31a extend upward in the front-to-rear direction. Further, the second reinforced parts 31b bulge upward from the central portion of the load transmission portion 32 in the front-to-rear direction.

The load transmission member 30 includes two first coupling pieces 33 in the section close to the center frame 20 (right side in FIGS. 2 to 5). The first coupling pieces 33 extend outward from the first reinforced parts 31a of the load transmission portion 32 in the front-to-rear direction. The load transmission member 30 includes four first coupling portions 34 in the section close to the center frame 20 in the width direction. Each first coupling portion 34 has a through-hole extending through the load transmission member 30 in the thickness direction. Two of the four first coupling portions 34 are laid out at the load transmission portion 32 in the section close to the center frame 20. The remaining two first coupling portions 34 are each formed on the corresponding first coupling piece 33. Thus, the load transmission member 30 includes the first coupling portions 34 at different heights in the vertical direction. The center frame 20 is coupled to the load transmission member 30 by fastening bolts 40 inserted through the two first coupling portions 34 of the load transmission portion 32 to the coupling nuts 25 of the lower frame 22 and fastening bolts 40 inserted through the first coupling portion 34 of the first coupling pieces 33 to the coupling nuts 25 of the coupling plate 24. Thus, the load transmission member 30 is coupled to the center frame 20 at different heights in the section close to the center frame 20 (right side in FIGS. 2 to 5).

Further, the load transmission member 30 includes two first temporary fixing portions 35 respectively extending from the first coupling pieces 33 toward the center frame 20. The first temporary fixing portions 35 are, for example, elastically deformable engagement tabs. The load transmission member 30 is temporarily fixed to the center frame 20 by extending the first temporary fixing portions 35 through the flanges 23 to insert the first temporary fixing portions 35 into the coupling holes 26a of the coupling plate 24 and locking the first temporary fixing portions 35 on the coupling plate 24.

The load transmission member 30 includes two second coupling pieces 36 in the section close to the roof side rail 13 (left side in FIGS. 2 to 5). Each second coupling piece 36 extends from the corresponding first reinforced part 31a of the load transmission portion 32. That is, the load transmission member 30 includes the second coupling pieces 36 extending from the edges of the load transmission portion 32 in the section close to the roof side rail 13. Each second coupling piece 36 extends outward from the corresponding first reinforced part 31a in the front-to-rear direction. The load transmission member 30 includes second coupling portions 37 each arranged on the corresponding second coupling piece 36. Each second coupling portion 37 has a through-hole extending through the corresponding second coupling piece 36 in the thickness direction. The load transmission member 30 is coupled to the roof side rail 13 by fastening bolts 40 inserted through the second coupling portions 37 to coupling nuts (not shown) on the roof side rail inner part 15 of the roof side rail 13.

In addition, the load transmission member 30 includes two second temporary fixing portions 39 each extending from the corresponding second coupling piece 36 toward the roof side rail 13. The second temporary fixing portions 39 are, for example, elastically deformable engagement tabs. The load transmission member 30 is temporarily fixed to the roof side rail 13 by inserting the second temporary fixing portions 39 into coupling holes (not shown) of the roof side rail 13 and locking the second temporary fixing portions 39 on the roof side rail 13.

As shown in FIG. 2, in the load transmission member 30, the first coupling portions 34 are arranged at the load transmission portion 32 in the section close to the center frame 20 (right side in FIGS. 2 to 5) in the width direction, and the second coupling portions 37 are arranged at the load transmission portion 32 in the section close to the roof side rail 13 (left side in FIGS. 2 to 5) in the width direction. The load transmission portion 32 is located between the first coupling portions 34 and the second coupling portions 37 as viewed in the front-to-rear direction (in a side view).

As shown in FIGS. 4 and 5, the load transmission member 30 includes two inflator supporting portions 38 in the vicinity of the central portion of the load transmission portion 32 in the width direction. Each inflator supporting portion 38 extends upward from the upper end of the corresponding first reinforced part 31*a*. The upper surface of each inflator supporting portion 38 is an arcuate supporting surface 38*a* as viewed in the front-to-rear direction. The curvature of the supporting surface 38*a* is the same as or substantially equal to the curvature of an inflator 43 of a curtain shield airbag 42. The two inflator supporting portions 38 support the opposite sides of the inflator 43 in the longitudinal direction. The inflator 43 is coupled to each inflator supporting portion 38 by bands 44. Thus, the inflator supporting portions 38 support the inflator 43 on the upper side of the load transmission member 30 in the vertical direction, and the inflator 43 is supported above the load transmission portion 32.

The method for manufacturing the roof structure 10 including the load transmission members 30 will now be briefly described. The following description focuses on only one of the load transmission members 30. The same applies to the other one of the load transmission members 30.

First, the inflator 43 is coupled to the two inflator supporting portions 38 of the load transmission member 30 by the bands 44 to support the inflator 43 with the inflator supporting portions 38 and couple the curtain shield airbag 42 to the load transmission member 30. Then, with the roof side rail 13 and the center frame 20 installed in the vehicle, the load transmission member 30 integrated with the curtain shield airbag 42 including the inflator 43 is lifted from the lower sides of the roof side rail 13 and the center frame 20.

Subsequently, the first temporary fixing portions 35 of the load transmission member 30 are temporarily fixed to the center frame 20. In addition, the second temporary fixing portions 39 of the load transmission member 30 are temporarily fixed to the roof side rail 13. When the load transmission member 30 is temporarily fixed to the roof side rail 13 and the center frame 20 in this manner, with the load transmission member 30 suspended from the roof side rail 13 and the center frame 20, the bolts 40 inserted through the first coupling portions 34 are fastened to the coupling nuts 25 of the center frame 20 to couple the load transmission member 30 to the center frame 20. Further, the bolts 40 inserted through the second coupling portions 37 are fastened to the coupling nuts (not shown) of the roof side rail 13 to couple the load transmission member 30 to the roof side rail 13.

As a result, the load transmission member 30 supporting the curtain shield airbag 42 is coupled to the roof side rail 13 and the center frame 20 so as to couple the roof side rail 13 and the center frame 20 to each other.

The operation of the vehicle roof structure 10 will now be described.

In the vehicle roof structure 10 according to the present embodiment, when a side collision causes a side part of the vehicle to receive a side collision load F (refer to FIG. 2), the side collision load F is transmitted from the roof side rail 13 to the center frame 20 through the load transmission member 30. The load transmission portion 32 of the load transmission member 30 allows the side collision load F to be efficiently transmitted to the center frame 20.

The above-described embodiment has the following advantages.

(1) The load transmission member 30 includes the load transmission portion 32, which is located between the first coupling portions 34 and the second coupling portions 37 as viewed in the front-to-rear direction (in a side view). The load transmission portion 32 includes the part 32*b*, which extends straight as viewed in the front-to-rear direction (in a side view). Thus, as compared to, for example, a curved load transmission portion as viewed in the front-to-rear direction (in a side view), the load transmission portion 32 resists deforming by the side collision load F and allows the side collision load F to be effectively transmitted to the center frame 20 when a side collision occurs.

(2) The load transmission member 30 includes the inflator supporting portions 38, which extend from the load transmission portion 32. The inflator supporting portions 38 allow the inflator 43 to be supported on the upper side of the load transmission member 30. Thus, when the roof structure 10 is manufactured, the load transmission member 30 can be coupled to the roof side rail 13 and the center frame 20 with the inflator 43 located on the inner side of the roof side rail 13. This eliminates the need to curve the load transmission portion 32 in order to, for example, avoid interference between the inflator 43 and the load transmission portion 32. Thus, the part 32*b* extending straight as viewed in the front-to-rear direction (in a side view) is arranged on the load transmission portion 32, and the side collision load F is efficiently transmitted to the center frame 20.

(3) The load transmission portion 32 is integrated with the first coupling portions 34 and the second coupling portions 37. Thus, for example, as compared to when the load transmission portion 32 is separate from the coupling portions 34 and 37, the side collision load F can be efficiently transmitted to the center frame 20.

(4) The load transmission portion 32 is shaped to have the part 32*b*, which extends straight as viewed in the front-to-rear direction (in a side view). Thus, for example, as compared to a curved load transmission portion as viewed in the front-to-rear direction (in a side view), the load transmission portion 32 has an increased rigidity. This eliminates, for example, the need to increase the thickness of the load transmission member 30 or the need for the load transmission member 30 to be made of a high-strength material so that the load transmission portion 32 has a necessary rigidity. That is, the rigidity of the load transmission portion 32 can be increased without increasing the weight of the roof structure 10.

(5) The load transmission member 30 includes the inflator supporting portions 38, which extend upward from the load transmission portion 32. The inflator supporting portions 38 support the inflator 43 on the upper side of the load transmission member 30 in the vertical direction. Thus, the inflator 43 can be arranged above the load transmission member 30. For example, since the inflator 43 is not located on the inner side of the load transmission member 30, no arrangement space is needed for the inflator 43 below the load transmission member 30.

(6) The first and second reinforced parts 31a and 31b cause the load transmission portion 32 to be corrugated so as to include the recesses 32a, which extend in the width direction. Thus, since the first and second reinforced parts 31a and 31b reinforce the load transmission portion 32, the load transmission portion 32 resists deforming by the side collision load F.

(7) The load transmission member 30 includes the first temporary fixing portions 35 and the second temporary fixing portions 39. The first temporary fixing portions 35 and the second temporary fixing portions 39 temporarily fix the load transmission member 30 to the center frame 20 and the roof side rail 13. Thus, when the roof structure 10 is manufactured, with the load transmission member 30 temporarily fixed to the center frame 20 and the roof side rail 13, the load transmission member 30 can be coupled to the roof side rail 13 and the center frame 20. Since the load transmission member 30 supports the inflator 43, the weight increases as compared to when only the load transmission member 30 is arranged. In the present embodiment, since the load transmission member 30 can be temporarily fixed to the center frame 20 and the roof side rail 13, the effort to support the load transmission member 30 is reduced, facilitating the coupling task. Thus, the arrangement of the first temporary fixing portions 35 and the second temporary fixing portions 39 on the load transmission member 30 is particularly effective for the load transmission member 30 including the inflator supporting portions 38.

It should be apparent to those skilled in the art that the present disclosure may be embodied in many other specific forms without departing from the spirit or scope of the disclosure. Particularly, it should be understood that the present disclosure may be embodied in the following forms.

The load transmission member 30 does not have to include the first temporary fixing portions 35 and the second temporary fixing portions 39 to temporarily fix the load transmission member 30 to the center frame 20 and the roof side rail 13.

In the load transmission member 30, the load transmission portion 32 only has to have a necessary rigidity and does not have to be corrugated to include the recesses 32a extending in the width direction.

The inflator supporting portion 38 may extend downward from the load transmission portion 32. Further, the inflator supporting portion 38 may support the inflator 43 on the lower side of the load transmission member 30 in the vertical direction. In this case, the inflator supporting portion 38 may support and suspend the inflator 43.

In the above-described embodiment, the reinforcement is embodied as the center frame 20. Instead, the reinforcement may be arranged on the vehicle roof 11 that does not include the roof opening 11a.

The number of the first coupling portions 34 and the number of the second coupling portions 37 can be changed.

The load transmission portion 32 does not have to include the first reinforced parts 31a and the second reinforced parts 31b.

The load transmission portion 32 may extend straight entirely in the width direction as viewed in the front-to-rear direction (in a side view).

The inflator 43 does not have to be coupled to the inflator supporting portions 38 by the bands 44. Instead, the inflator 43 may be coupled to the inflator supporting portions 38, for example, by clips, through welding, or by an adhesive.

Therefore, the present examples and embodiments are to be considered as illustrative and not restrictive and the disclosure is not to be limited to the details given herein, but may be modified within the scope and equivalence of the appended claims.

The invention claimed is:

1. A vehicle roof structure comprising:
    two roof side rails extending in a front-to-rear direction of a vehicle on opposite sides of an upper part of the vehicle in a width direction of the vehicle;
    a reinforcement arranged on a vehicle roof to extend in the width direction between the two roof side rails on the opposite sides in the width direction;
    a load transmission member coupled to the reinforcement and one of the two roof side rails so as to couple the roof side rail and the reinforcement to each other, wherein the load transmission member transmits load from the roof side rail to the reinforcement when a side collision occurs; and
    an inflator arranged on an inner side of the roof side rail, wherein the inflator supplies an airbag with gas, wherein
    the load transmission member includes
        a first coupling portion that couples the load transmission member to the reinforcement,
        a second coupling portion that couples the load transmission member to the roof side rail,
        a load transmission portion located between the first coupling portion and the second coupling portion when the load transmission member is viewed in the front-to-rear direction, wherein the load transmission portion includes a part extending straight in the width direction, and
        an inflator supporting portion extending from the load transmission portion, wherein the inflator supporting portion is configured to support the inflator such that the inflator is above the inflator supporting portion.

2. The vehicle roof structure according to claim 1, wherein the inflator supporting portion is configured to support the inflator on an upper side of the load transmission member in a vertical direction of the vehicle.

3. The vehicle roof structure according to claim 1, wherein the load transmission portion is corrugated to include a recess extending in the width direction.

4. The vehicle roof structure according to claim 1, wherein the load transmission member includes a temporary fixing portion configured to temporarily fix the load transmission member to the reinforcement and the roof side rail.

5. The vehicle roof structure according to claim 1, wherein
    when viewed from the front-to-rear direction of the vehicle, an end of the reinforcement in the width direction is separated from the inflator supporting portion, and
    the part extending straight in the width direction is configured to extend straight in the width direction between the end of the reinforcement in the width direction and the inflator supporting portion.

6. A load transmission member of a vehicle roof structure, wherein the load transmission member transmits load from one of two roof side rails to a reinforcement when a side collision occurs, the two roof side rails extend in a front-to-rear direction of a vehicle on opposite sides of an upper part of the vehicle in a width direction of the vehicle, the reinforcement is arranged on a vehicle roof to extend in the width direction between the two roof side rails, the load transmission member comprises:
- a first coupling portion that couples the load transmission member to the reinforcement;
- a second coupling portion that couples the load transmission member to the roof side rail;
- a load transmission portion located between the first coupling portion and the second coupling portion when the load transmission member is viewed in the front-to-rear direction, wherein the load transmission portion includes a part extending straight in the width direction; and
- an inflator supporting portion extending from the load transmission portion that is configured to support an inflator that is arranged on an inner side of the roof side rails and above the inflator supporting portion, wherein the inflator supplies an airbag with gas.

7. The load transmission member of claim 6, wherein when viewed from the front-to-rear direction of the vehicle, an end of the reinforcement in the width direction is separated from the inflator supporting portion, and the part extending straight in the width direction is configured to extend straight in the width direction between the end of the reinforcement in the width direction and the inflator supporting portion.

8. A method for manufacturing a vehicle roof structure, the method comprising:
- extending one of two roof side rails in a front-to-rear direction of a vehicle on one of opposite sides of an upper part of the vehicle in a width direction of the vehicle;
- extending the other one of the two roof side rails in the front-to-rear direction on the other one of the opposite sides of the upper part of the vehicle in the width direction;
- arranging a reinforcement on a vehicle roof to extend in the width direction between the two roof side rails on the opposite sides in the width direction;
- providing a load transmission member to allow load to be transmitted from the one of the two roof side rails to the reinforcement when a side collision occurs;
- coupling the load transmission member to the roof side rail and the reinforcement so as to couple the roof side rail and the reinforcement to each other; and
- arranging an inflator that supplies an airbag with gas on an inner side of the roof side rail, wherein the providing the load transmission member includes
- arranging a first coupling portion that couples the load transmission member to the reinforcement on the load transmission member,
- arranging a second coupling portion that couples the load transmission member to the roof side rail on the load transmission member,
- arranging a load transmission portion located between the first coupling portion and the second coupling portion when the load transmission member is viewed in the front-to-rear direction, wherein the load transmission portion includes a part extending straight in the width direction, and
- arranging an inflator supporting portion that supports the inflator to extend from the load transmission portion, wherein the inflator is above the inflator supporting portion.

9. The method of claim 8, wherein the load transmission portion is arranged such that the part extending straight in the width direction, when viewed from the front-to-rear direction of the vehicle, extends straight in the width direction between an end of the reinforcement in the width direction and the inflator supporting portion, and the end of the reinforcement in the width direction is separated from the inflator supporting portion.

\* \* \* \* \*